US007653682B2

(12) United States Patent
Erasani et al.

(10) Patent No.: US 7,653,682 B2
(45) Date of Patent: Jan. 26, 2010

(54) CLIENT FAILURE FENCING MECHANISM FOR FENCING NETWORK FILE SYSTEM DATA IN A HOST-CLUSTER ENVIRONMENT

(75) Inventors: Pranoop Erasani, Sunnyvale, CA (US); Stephen Daniel, Durham, NC (US); Joseph Richart, Raleigh, NC (US); Thomas Haynes, Tulsa, OK (US)

(73) Assignee: NetApp, Inc., Sunnyvale, CA (US)

( * ) Notice: Subject to any disclaimer, the term of this patent is extended or adjusted under 35 U.S.C. 154(b) by 380 days.

(21) Appl. No.: 11/187,781

(22) Filed: Jul. 22, 2005

(65) Prior Publication Data

US 2007/0022138 A1 Jan. 25, 2007

(51) Int. Cl.
*G06F 15/16* (2006.01)
(52) U.S. Cl. ...................................................... 709/201
(58) Field of Classification Search .................. 709/201, 709/205; 707/104.1, 200
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,843,541 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,916,608 A | 4/1990 | Shultz | |
| 4,989,206 A | 1/1991 | Dunphy, Jr. et al. | |
| 5,097,439 A * | 3/1992 | Patriquin et al. | ................ 711/2 |
| 5,124,987 A | 6/1992 | Milligan et al. | |

(Continued)

FOREIGN PATENT DOCUMENTS

EP 1 107 119 A2 6/2001

(Continued)

OTHER PUBLICATIONS

Notification of Transmittal of the International Search Report and the Written Opinion of the International Searching Authority, or the Declaration. PCT/US2006/028494. Jul. 20, 2006.

(Continued)

*Primary Examiner*—Andrew Caldwell
*Assistant Examiner*—Jason Recek
(74) *Attorney, Agent, or Firm*—Cesari and McKenna, LLP

(57) ABSTRACT

A method and system performs a fencing technique in a host cluster storage environment. The fence program executes on each cluster member in the cluster, and the cluster is coupled to a storage system by a network. When a cluster member fails or cluster membership changes, the fence program is invoked and a host fencing API message is sent via the network to the storage system. The storage system in turn modifies export lists to restrict further access by the failed cluster node to otherwise fence the failed cluster node off from that storage system or from certain directories within that storage system.

19 Claims, 9 Drawing Sheets

U.S. PATENT DOCUMENTS

| | | | |
|---|---|---|---|
| 5,129,088 | A | 7/1992 | Auslander et al. |
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,426,747 | A | 6/1995 | Weinreb et al. |
| 5,485,579 | A | 1/1996 | Hitz et al. |
| 5,511,177 | A | 4/1996 | Kagimasa et al. |
| 5,568,629 | A | 10/1996 | Gentry et al. |
| 5,581,724 | A | 12/1996 | Belsan et al. |
| 5,694,550 | A * | 12/1997 | Takeda et al. ............... 709/226 |
| 5,764,972 | A | 6/1998 | Crouse et al. |
| 5,802,366 | A | 9/1998 | Row et al. |
| 5,819,292 | A | 10/1998 | Hitz et al. |
| 5,828,876 | A | 10/1998 | Fish et al. |
| 5,832,513 | A | 11/1998 | Kennedy |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 5,987,495 | A * | 11/1999 | Ault et al. .................... 718/108 |
| 6,038,570 | A | 3/2000 | Hitz et al. |
| 6,065,037 | A | 5/2000 | Hitz et al. |
| 6,128,627 | A | 10/2000 | Mattis et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,240,527 | B1 | 5/2001 | Schneider et al. |
| 6,275,898 | B1 | 8/2001 | DeKoning |
| 6,397,311 | B1 | 5/2002 | Capps et al. |
| 6,425,035 | B2 | 7/2002 | Hoese et al. |
| 6,457,021 | B1 | 9/2002 | Berkowitz et al. |
| 6,516,380 | B2 | 2/2003 | Kenchammana-Hoskote et al. |
| 6,526,478 | B1 | 2/2003 | Kirby |
| 6,571,261 | B1 | 5/2003 | Wang-Knop et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,721,764 | B2 | 4/2004 | Hitz et al. |
| 6,732,124 | B1 | 5/2004 | Koseki et al. |
| 6,804,706 | B2 | 10/2004 | Pitts |
| 6,868,417 | B2 | 3/2005 | Kazar et al. |
| 6,978,283 | B1 | 12/2005 | Edwards et al. |
| 7,010,528 | B2 * | 3/2006 | Curran et al. ................... 707/8 |
| 7,039,827 | B2 * | 5/2006 | Meyer et al. .................... 714/4 |
| 7,055,058 | B2 | 5/2006 | Lee et al. |
| 7,133,983 | B2 | 11/2006 | Bartfei et al. |
| 7,194,597 | B2 | 3/2007 | Willis et al. |
| 7,231,412 | B2 | 6/2007 | Hitz et al. |
| 7,409,494 | B2 | 8/2008 | Edwards et al. |
| 7,516,285 | B1 | 4/2009 | Haynes et al. |
| 2002/0049883 | A1 | 4/2002 | Schneider et al. |
| 2003/0217077 | A1* | 11/2003 | Schwartz et al. ............ 707/200 |
| 2004/0030668 | A1 | 2/2004 | Pawlowski |
| 2004/0123053 | A1 | 6/2004 | Karr et al. .................... 711/152 |
| 2004/0210656 | A1 | 10/2004 | Beck et al. ................... 709/225 |
| 2005/0097260 | A1 | 5/2005 | McGovern et al. |
| 2005/0246393 | A1* | 11/2005 | Coates et al. ............... 707/200 |
| 2005/0283641 | A1* | 12/2005 | Clark et al. ..................... 714/4 |
| 2006/0184587 | A1 | 8/2006 | Federwisch et al. |
| 2006/0212453 | A1* | 9/2006 | Eshel et al. ................... 707/10 |
| 2007/0088702 | A1 | 4/2007 | Fridella et al. |

FOREIGN PATENT DOCUMENTS

| | | |
|---|---|---|
| WO | WO 89/10594 | 11/1989 |

OTHER PUBLICATIONS

"Notification of Receipt of Record Copy," International Filing Date: Jul. 20, 2006, International Application No. PCT/US2006/028494, Applicant: Network Applicance, Inc., Date of Mailing: Oct. 6, 2006, pp. 1-7.

"Notification of Concerning Transmittal of International Preliminary Report on Patentability (Chapter I of the Patent Cooperation Treaty)," International Filing Date: Jul. 20, 2006, International Application No. PCT/US2006/028494, Applicant: Network Applicance, Inc., Date of Mailing: Jan. 31, 2008, pp. 1-8.

Administration Guide found at http://www.openafs.org/pages/doc/AdminGuide/auagd010.htm, visited on Mar. 2, 2005.

Basilico, et al., *Error Correction System Using "Shadow Memory*," IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981© 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, in Proceedings of the USENIX Winter 1992.

Clark, B.E., et al., *Application System/400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite* —Computing Systems, 4(4), Fall 1991, pp. 353-385?{copy of article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Hitz, David, et al. *System and Method for Enabling a Storage System to Support Multiple Volume Formats Simultaneously*, USPTO U.S. Appl. No. 60/652,626. Feb. 14, 2005.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

Mckusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkely, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*, Department of Computer Science, Carnegie Mellon University, Feb. 1989, 28 pages.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Tranactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at htto://www.openats.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Akyurek, Sedat, Placing Replicated Data to Reduce Seek Delays, Department of Computer Science, University of Maryland, UMIACS-TR-91-121, CS-TR-2746, Aug. 1991.

Asante Desktop EN/SC Adapters User's Manual Apr. 1996.

Asante EN/SC Adapter Family Installation Guide May 1994.

Auspex Systems, LFS—A Local File System for Multiprocessor NFS Network Servers, 1994.

Bhattacharya, Supama et al., "Coordinating Backup/Recovery and Data Consistency between Database and File Systems", ACM, Jun. 2002, pp. 500-511.

Callaghan B., "NFS Version 3 Protocol Specification", Request for Comments (RFC) 1813 Jun. 1995.

Celerra File Server Architecture for High Availability, EMC2 where information lives, Aug. 1999, pp. 1-7.

Chaudhuri, Surajit, et al., Self-Tuning Technology in Microsoft SQL Server, Data Engineering Journal 22, Feb. 1999 pp. 20-27.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Coyne, Robert A., et al., Storage Systems for National Information Assets, Proc. Supercomputing 92, Minneapolis, Nov. 1992, pp. 626-633.

Fielding, et al., (1999) Request for Comments (RFC) 2616, HTTP/1.1.

Finlayson, Ross S., et al., Log Files: An Extended File Service Exploiting Write-Once Storage Department of Computer Science, Stanford University, Report No. STAN-CS-87/1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Kazar, Michael Leon, Synchronization and Caching Issues in the Andrew File System, Carnegie Mellon University, CMU-ITC-88-063.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Levine, Ron and Gervais, Michelle, Building a SAN, SunExpert Magazine, Mar. 1999, pp. 50-64.

Lorie, Raymond, A. Physical Integrity in a Large Segmented Database, ACM Trans. Database Syst., vol. 2, Mar. 1977, pp. 91-104.

Lu, Y. "Performance Study of iSCSI-Based Storage Subsystems", IEEE Communications Magazine, pp. 76-82, Aug. 2003.

Maintenance Procedures ND (8C) nd-network disk control Feb. 1985.

Misc. Reference Manual Pages ND (4P) nd-network disk driver Jul. 26, 1985.

Nelson, Michael et al., "Caching in the Sprite Network File System", ACM, Nov. 1987, pp. 3-4.

Network Appliance ends NAS-SAN war by Computerwire, http://www.theregister.co.uk/2002/10/102/network.sub.-- appliance.sub.-- en- ds.sub.--nassan.sub.--war/print.html, Published Wednesday, Oct. 2, 2002.

Performance Without Compromise: The Virtual Storage Architecture 1997.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Subramanian, Muralidhar, et al., Performance Challenges in Object-Relational DBMSs, Data Engineering Journal 22, Feb. 1999 pp. 28-32.

Unix Workstation System Administration Education Certification Course, Jan. 8, 2002.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

U.S. Appl. No. 10/705,470, Fair, et al., titled Method for Detecting Leaked Buffer Writes Across File System Consistency Points.

U.S. Appl. No. 10/705,025, filed Nov. 10, 2003, Hamilton, et al., titled System and Method for Managing File Metadata During Consistency Points.

International Search Report PCT/US03/23597, Apr. 14, 2004, 8 pages, International Searching Authority, Alexandria, Virginia, USA.

* cited by examiner

CLIENT FAILURE FENCING MECHANISM FOR FENCING NETWORK FILE SYSTEM DATA IN A HOST-CLUSTER ENVIRONMENT

BACKGROUND OF THE INVENTION

1. Field of the Invention

This invention relates to data storage systems, and more particularly, to failure fencing in networked data storage systems.

2. Background Information

A storage system is a computer that provides storage service relating to the organization of information on writable persistent storage devices, such as memories, tapes or disks. The storage system is commonly deployed within a storage area network (SAN) or a networked storage environment. When used within a networked environment, the storage system may be embodied as a storage system including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

In the client/server model, the client may comprise an application executing on a computer that "connects" to a storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system (a storage operating system, as hereinafter defined) enables access to stored information using block-based access protocols over the "extended bus." In this context, the extended bus is typically embodied as Fibre Channel (FC) or Ethernet media (i.e., network) adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and placing of that storage on a network. However, the SAN storage system typically manages specifically assigned storage resources. Although storage can be grouped (or pooled) into zones (e.g., through conventional logical unit number or "lun" zoning, masking and management techniques), the storage devices are still pre-assigned by a user that has administrative privileges, (e.g., a storage system administrator, as defined hereinafter) to the storage system.

Thus, the storage system, as used herein, may operate in any type of configuration including a NAS arrangement, a SAN arrangement, or a hybrid storage system that incorporates both NAS and SAN aspects of storage.

Access to disks by the storage system is governed by an associated "storage operating system," which generally refers to the computer-executable code operable on a storage system that manages data access, and may implement file system semantics. In this sense, the NetApp® Data ONTAP™ operating system available from Network Appliance, Inc., of Sunnyvale, Calif. that implements the Write Anywhere File Layout (WAFL™) file system is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

In many high availability server environments, clients requesting services from applications whose data is stored on a storage system are typically served by coupled server nodes that are clustered into one or more groups. Examples of these node groups are Unix®-based host-clustering products. The nodes typically share access to the data stored on the storage system from a direct access storage/storage area network (DAS/SAN). Typically, there is a communication link configured to transport signals, such as a heartbeat, between nodes such that during normal operations, each node has notice that the other nodes are in operation.

In the case of a two-node cluster, for example, the absence of a heartbeat signal indicates to a node that there has been a failure of some kind. However, if both nodes are still in normal operating condition, the absent heartbeat signal may be the result of interconnect failure. In that case, the nodes are not in communication with one another and, typically, only one node should be allowed access to the shared storage system. In addition, a node that is not properly functioning may need to have its access to the data of the storage system restricted.

But, in a networked storage device, access to a storage system is typically through a conventional file system protocol, such as the network file system (NFS) protocol. Thus, any techniques that are used to restrict access to data with respect to a NAS device would need to incorporate the NFS protocol. Moreover, the NFS protocol does not support SCSI reservations, and thus prior techniques which relied on SCSI reservations would not be suitable for an environment in which access to the storage system is through NFS. Thus, a network accessed storage system does not fit into this traditionally disk-based host cluster model.

There remains a need, therefore, for a host cluster environment that includes failure fencing but that can support NFS data access from a networked clustered environment that is interfaced with the storage system.

There remains a further need for performing fencing operations without requiring a traditional SCSI-based reservation mechanism when a cluster does not predominantly share data from a directly attached disk, but instead functions in a networked storage environment.

In addition, there remains a need for a simple user interface adapted to perform fencing operations for the cluster, which can be easily downloaded into the host clustering framework.

SUMMARY OF THE INVENTION

The present invention overcomes the disadvantages of the prior art by providing a clustered storage environment that includes a fencing mechanism that supports a file system protocol, such as the network file system (NFS) protocol, as a shared data source in the clustered environment. More specifically, a plurality of nodes interconnected as a cluster is configured to utilize the storage services provided by an associated networked storage system. Each node in the cluster is an identically configured redundant node that may be utilized in the case of failover or for load balancing with respect to the other nodes in the cluster. The nodes are hereinafter referred to as a "cluster members." Each cluster member is supervised and controlled by cluster software executing on one or more processors in the cluster member. In accordance with illustrative embodiments of the invention, in addition to the cluster software, a novel fencing program resides on each cluster member and implements program instructions for fencing operations for the clustered storage environment.

The clusters are coupled with the associated storage system through an appropriate network such as a wide area network, a virtual private network implemented over a public network (Internet), or a shared local area network. For a networked environment, the clients are typically configured to access information stored on the storage system as directories and files. The cluster members typically communicate with the storage system over a network by exchanging discreet frames or packets of data according to predefined protocols, such as the NFS over Transmission Control Protocol/Internet Protocol (TCP/IP).

In accordance with illustrative embodiments of the invention, a change in cluster membership is detected by the cluster software and, in response, the fencing program is initiated. The fencing program generates host fencing application programming interface (API) messages that notify a NFS server of the storage system to instruct an export module to change access permission rights of one or more cluster members affected by the change (i.e., the "target" cluster members) such that write access by the target cluster members is restricted from certain data in the form of files, directories, or the storage system itself. Details about the API by which the export module is instructed to change access permission rights are provided in commonly-owned U.S. patent application Ser. No. 11/187,649, of Haynes, et al., for AN API FOR FENCING CLUSTER HOSTS VIA EXPORT ACCESS RIGHTS, filed on even date herewith and issued as U.S. Pat. No. 7,516,285 on Apr. 7, 2009, which is hereby incorporated by reference as though fully set forth herein.

Cluster membership can change when there is a failure of one or more of the cluster members, or upon the addition of a new cluster member, or upon a failure of the communication link between cluster members, for example. However, a change in cluster membership and thus the need for fencing, and/or unfencing, is determined by the cluster software, which may in turn be controlled by a quorum device or other software arrangement controlling the cluster, all of which are hereinafter generally referred to as the cluster infrastructure.

More specifically, when a fencing operation is to be performed, the fencing program, either by an administrator through a user interface, or automatically, generates and transmits an API message via a predetermined protocol, such as the HyperText Transfer Protocol ("HTTP"), over the network to the storage system. In particular, if a member of the cluster is to be fenced off, one of the surviving cluster members transmits the API message using HTTP, which is received by a HTTP module of the storage system. The message is parsed and sent to an NFS subsystem of the storage system.

The NFS server has associated therewith certain export lists that provide rules relating to access to the NFS data served by the storage system. More specifically, an access rule provides the authentication level required for read access, read/write access and/or administrative (root) access by a client identified by a particular network address. For example, when processing an incoming data access request directed to the storage system, a search is performed through an ordered export list of rules in a rule set to find a match between the network address of the client and a specific rule in the export list. If no match is found, then the data access request is denied. If a match is found, then the matching rule indicates the permission rights that the particular client has, i.e., read-write access, or read-only access to the specified data container, which may be a file, a directory or a storage system.

According to illustrative embodiments of the present invention, the API message issued by the fencing program executing on the cluster member not affected by the change in cluster membership (i.e., the "surviving" cluster member) notifies the NFS server in the storage system that a modification must be made in one of the export lists such that a target cluster member, for example, cannot write to any of the disks in the storage system, thereby fencing off that member from that data. The fenced cluster member may continue to have read access so that when it comes back online, the fenced member can read relevant storage devices in the storage system to bring the node up to date with the current state of the data in the storage system. After the fencing is no longer needed i.e when the node becomes member of the cluster (either through administrative action or the cluster framework implementation), an "unfence" operation can be performed to allow access to the relevant data.

BRIEF DESCRIPTION OF THE DRAWINGS

The above and further advantages of the invention may be better understood by reference to the following description in conjunction with the accompanying drawings, in which like reference numerals indicate identical or functionally similar elements.

DETAILED DESCRIPTION OF AN ILLUSTRATIVE EMBODIMENT

A. Cluster Environment

Figure 1:
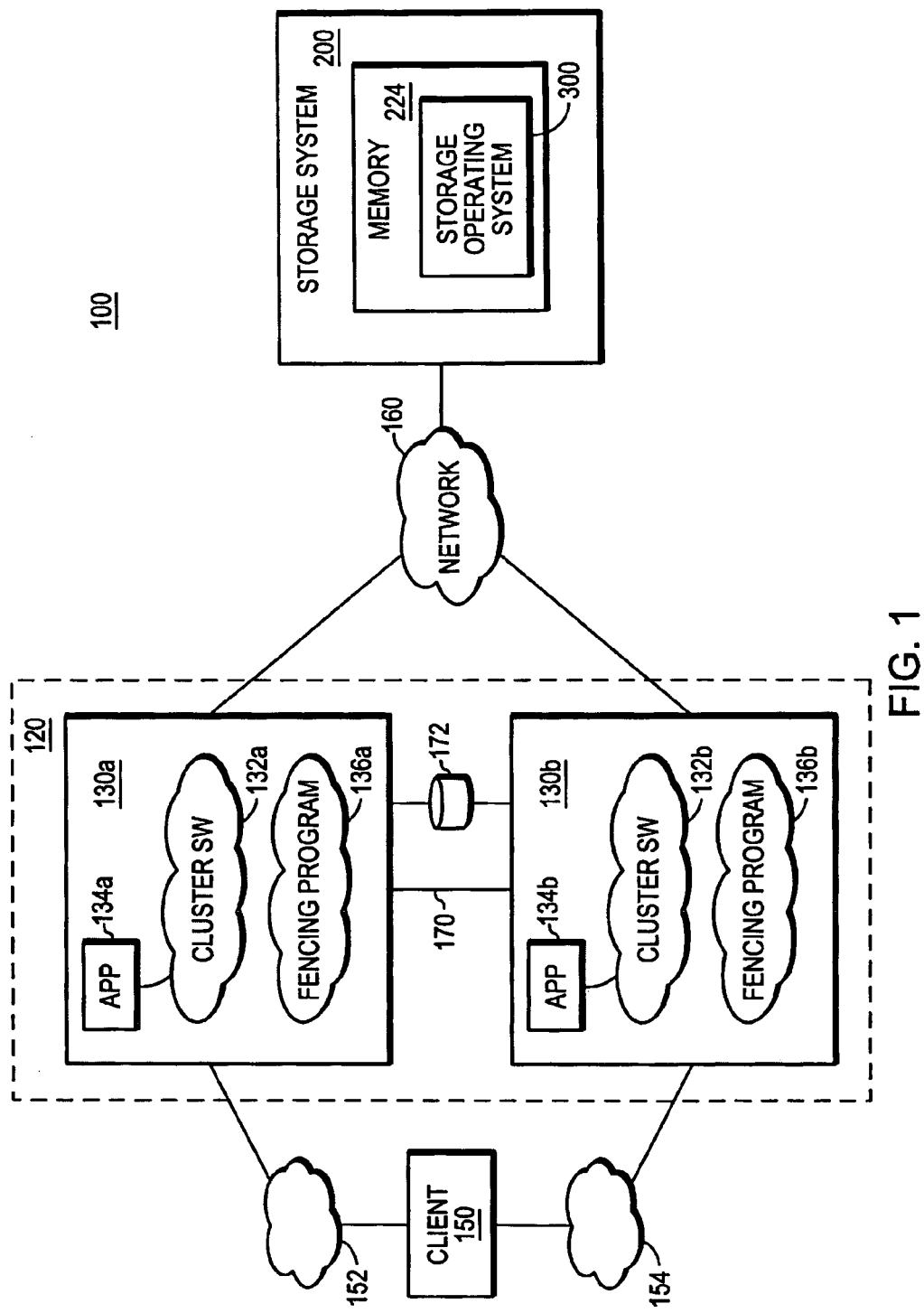
FIG. 1 is a schematic block diagram of a storage environment, which includes an interconnected set of cluster members coupled by a network to a storage system in which illustrative embodiments of the present may be advantageously employed.

FIG. 1 is a schematic block diagram of a storage environment 100 that includes a cluster 120 having cluster members 130a and 130b, each of which is an identically configured redundant node that utilizes the storage services of an associated storage system 200. For purposes of clarity of illustration, the cluster 120 is depicted as a two-node cluster, however, the architecture of the environment 100 can vary from that shown while remaining within the scope of the present invention.

Cluster members 130a and 130b comprise various functional components that cooperate to provide data from storage devices of the storage system 200 to a client 150. The cluster member 130a includes a plurality of ports that couple the member to the client 150 over a computer network 152. Similarly, the cluster member 130b includes a plurality of ports that couple that member with the client 150 over a computer network 154. In addition, each cluster member 130, for example, has a second set of ports that connect the cluster member to the storage system 200 by way of a network 160. The cluster members 130a and 130b, in the illustrative example, communicate over the network 160 using a Transmission Control Protocol/Internet Protocol (TCP/IP). It should be understood that although networks 152, 154 and 160 are depicted in FIG. 1 as individual networks, these networks may in fact comprise a single network or any number of multiple networks, and the cluster members 130a and 130b can be interfaced with one or more of such networks in a variety of configurations while remaining within the scope of the present invention.

In addition to the ports which couple the cluster member 130a to the client 150 and to the network 160, the cluster member 130a also has a number of program modules executing thereon. For example, cluster software 132a performs overall configuration, supervision and control of the operation of the cluster member 130a. An application 134a running on the cluster member 130a communicates with the cluster software to perform the specific function of the application running on the cluster member 130a. This application 134a may be, for example, an Oracle® database application. In accordance with an illustrative embodiment of the invention, the cluster member 130a also includes a fencing program 136a, as described in further detail hereinafter.

Similarly, cluster member 130b includes cluster software 132b which is in communication with an application program 134b. A fencing program 136b, in accordance with the invention, executes on the cluster member 130b. The cluster members 130a and 130b are illustratively coupled by a cluster interconnect 170. In addition, each of the cluster members 130a and 130b may optionally be directly attached to a quorum disk 172 which provides quorum services for the cluster 120 such that if a cluster member detects the absence of a notification, such as a heartbeat, from another cluster member, that cluster member will attempt to assert a claim by, for example, asserting a SCSI-3 persistent reservation, on the quorum device in order to have continued access to the storage device, as described previously herein.

B. Storage System

Figure 2:
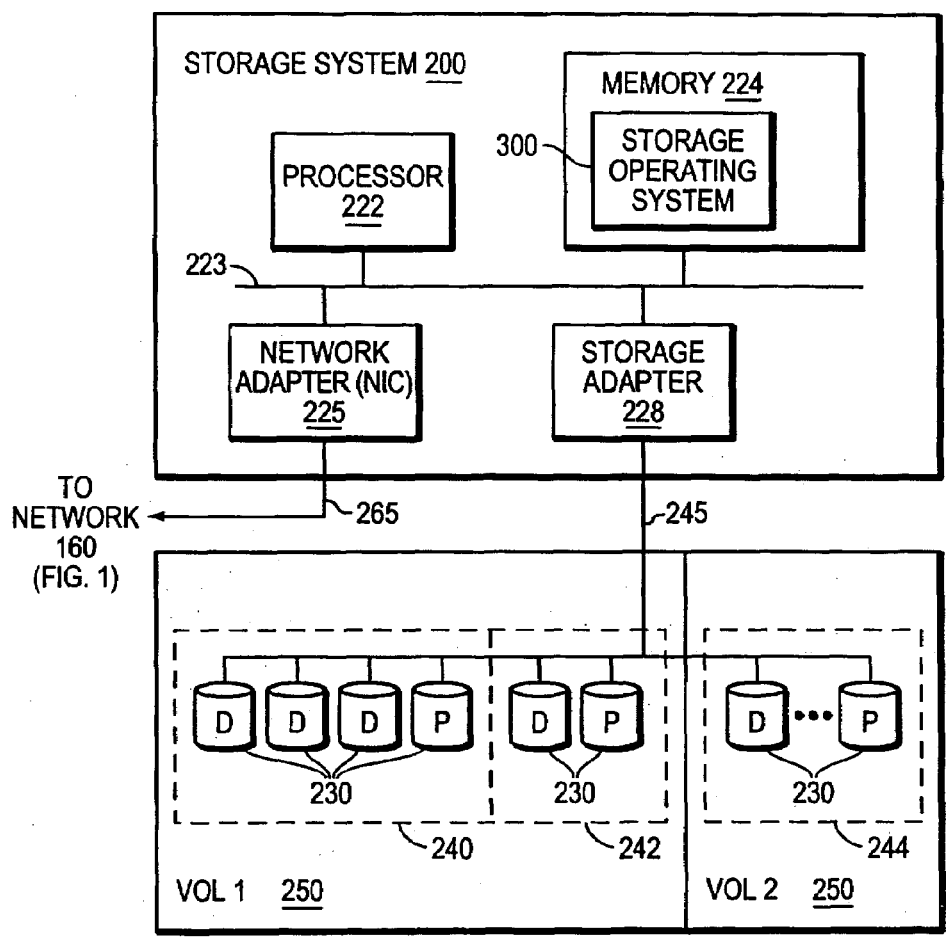
FIG. 2 is a schematic block diagram of the storage system that may be advantageously used in accordance with an embodiment of the present invention.

FIG. 2 is a more detailed schematic block diagram of the storage system 200 that is connected to the network 160 in order to serve data with respect to the cluster 120. The storage system 200 comprises one or more processors 222, a memory 224, a network adapter 225 and a storage adapter 228 interconnected by a system bus 223. The network adapter 225 comprises a plurality of ports adapted to couple the storage system 200 to the cluster 120 by way of the network 160. The storage system 200 also includes a storage operating system 300 that includes a virtualization system including a file system to logically organize the information as a hierarchical structure of named directory, file and virtual disk (vdisk) storage objects on disk drives 230. An example of a storage system that may be advantageously used with the present invention is described in co-pending, commonly assigned U.S. Patent Application Publication No. 2004/0030668 A1, filed on Aug. 9, 2002, entitled A MULTIPROTOCOL STORAGE APPLIANCE THAT PROVIDES INTEGRATED SUPPORT FOR FILE AND BLOCK ACCESS PROTOCOLS, which application is hereby incorporated by reference as though fully set forth herein.

In the illustrative embodiment, the memory 224 comprises storage locations that are addressable by the processor and adapters for storing software program code and data structures, the latter containing information passed between disk drives and the network during normal runtime operations. The processor and adapters may comprise processing elements and/or logic circuitry configured to execute the software code and manipulate the data structures. The storage operating systems 200, portions of which are typically resident in memory and executed by the processing elements, functionally organizes the storage system by, inter alia, invoking storage operations in support of the storage service implemented by the system. It will be apparent to those skilled in the art that other processing and memory means, including various computer readable media, may be used for storing and executing program instructions pertaining to the invention described herein.

Whereas clients of a NAS-based network environment have a storage viewpoint of files, the clients of a SAN-based network environment have a storage viewpoint of blocks or disks. To that end, the storage system 200 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The storage system 200 thereafter makes these emulated disks accessible to SAN clients.

The network adapter 225 couples the storage system 200 to a cluster, such as the cluster 120, over point-to-point links, wide area networks, virtual private networks implemented over a public network (Internet) or a shared local area network, as illustrated by the arrow 265. For a NAS-based network environment, the clients are configured to access information stored on the storage system 200 as files. The cluster 120 communicates with the storage system over network 160 by exchanging discrete frames or packets of data according to pre-defined protocols, such as NFS over the TCP/IP protocol.

The cluster 120 may include general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 150 may request the services of the storage system 200 by issuing file access protocol messages (in the form of packets) to the system over the network 160. For example, a cluster member 130a running the Windows operating system may communicate with the storage system 200 using the Common Internet File System (CIFS) protocol over TCP/IP. On the other hand, a cluster member 130b running the UNIX operating system may communicate with the storage system using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the storage system using other file access protocols.

The storage adapter 228 cooperates with the storage operating system 300 executing on the storage system 200 to access information requested by the clients. The information may be stored in the disk drives 230 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 222 (or the adapter 228 itself) prior to being forwarded over the system bus 223 to the network adapters 225 where the information is formatted into packets or messages and returned to the clients.

Storage of information on the storage system 200 is preferably implemented as one or more storage volumes (e.g., VOL1-2 250) that comprise a cluster of physical storage disk drives 230, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 250 is constructed from an array of physical disk drives 230 that are organized as RAID groups 240, 242, and 244. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disk drives 230, the storage operating system 300 implements a write-anywhere file system that cooperates with virtualization modules to provide a system that "virtualizes" the storage space provided by the disk drives 230. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system, which is described more fully with reference to FIG. 3, allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

As noted, in the illustrative embodiment, the storage operating system is preferably the NetApp® Data ONTAP™ operating system that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP storage operating system. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

C. Storage Operating System

Figure 3:
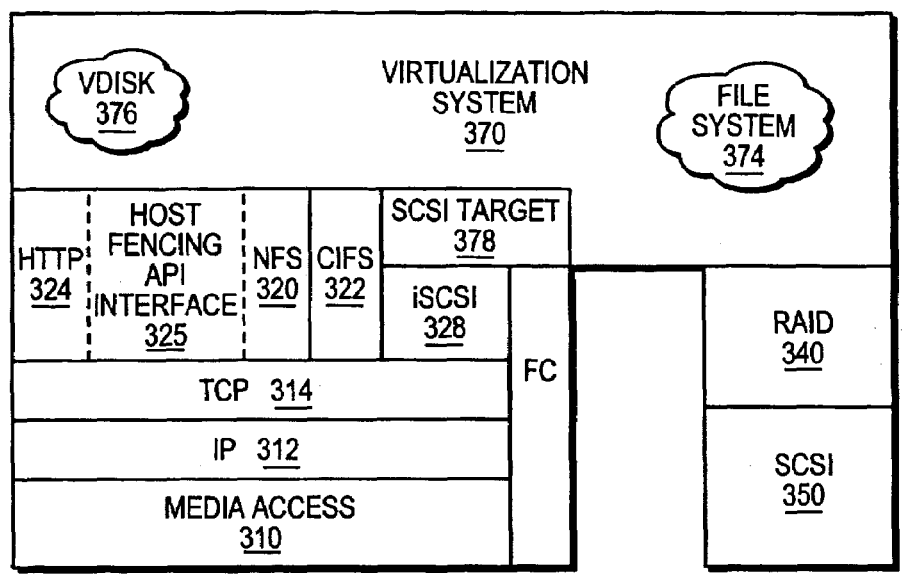
FIG. 3 is a schematic block diagram of a storage operating system that may be advantageously used in accordance with an embodiment of the present invention.

FIG. 3 is a schematic block diagram of a storage operating system 300 that may be advantageously used with embodiments of the present invention. The storage operating system 300 comprises a series of software layers organized to form an integrated network protocol stack or, more generally, a multi-protocol engine that provides data paths for clients to access information stored on the storage system 200 using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314. A file system protocol layer provides multi-protocol file access and, to that end, includes support for the NFS protocol 320, the CIFS protocol 322 and the Hypertext Transfer Protocol (HTTP) protocol 324. As described further herein, the NFS protocol layer 320 is illustratively embodied as an NFS server.

An iSCSI driver layer 328 provides block protocol access over the TCP/IP network protocol layers, while a FC driver layer 330 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage system. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 370. The virtualization system 370 includes a file system 374 interacting with virtualization modules illustratively embodied as, e.g., vdisk module 376 and SCSI target module 378. It should be noted that the vdisk module 376, the file system 374 and SCSI target module 378 can be implemented in software, hardware, firmware, or a combination thereof. The vdisk module 376 communicates with the file system 374 to enable access by administrative interfaces in response to a storage system administrator issuing commands to the storage system 200. In essence, the vdisk module 376 manages SAN deployments by, among other things, implementing a comprehensive set of vdisk (lun) commands issued by the storage system administrator. These vdisk commands are converted to primitive file system operations ("primitives") that interact with the file system 374 and the SCSI target module 378 to implement the vdisks.

The SCSI target module 378 initiates emulation of a disk or lun by providing a mapping procedure that translates luns into the special vdisk file types. The SCSI target module is illustratively disposed between the FC and iSCSI drivers 330, 328 and the file system 374 to thereby provide a translation layer of the virtualization system 370 between the SAN block (lun) space and the file system space, where luns are represented as vdisks 376. To that end, the SCSI target module 378 has a set of APIs that are based on the SCSI protocol and that enable a consistent interface to both the iSCSI and FC drivers 328, 330, respectively. By "disposing" SAN virtualization over the file system 374, the storage system 200 reverses the approaches taken by prior systems to thereby provide a single unified storage platform for essentially all storage access protocols.

The file system 374 provides volume management capabilities for use in block-based access to the information stored on the storage devices, such as disks. That is, in addition to providing file system semantics, such as naming of storage objects, the file system 374 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system.

The file system 374 illustratively implements the WAFL® file system having an on-disk format representation that is block-based using, e.g., 4 kilobyte (KB) blocks and using inodes to describe files. The WAFL® file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in commonly owned U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

It should be understood that the teachings of this invention can be employed in a hybrid system that includes several types of different storage environments such as the particular storage environment 100 of FIG. 1. The invention can be used by a storage system administrator that deploys a system implementing and controlling a plurality of satellite storage environments that, in turn, deploy thousands of drives in multiple networks that are geographically dispersed. Thus, the term "storage system" as used herein, should, therefore, be taken broadly to include such arrangements.

D. Fencing Operations

In an illustrative embodiment of the present invention, the host-cluster environment includes a fencing mechanism that supports a file system protocol, such as NFS, as a shared data source in the clustered environment. More specifically, a plurality of nodes is interconnected as a cluster and is configured to utilize the storage services provided by an associated networked storage system. Each node in the cluster, referred to as a "cluster member," is supervised and controlled by cluster software executing on one or more processors in the cluster member. In accordance with illustrative embodiments of the invention, in addition to the cluster software, a fencing program resides on each cluster member and implements program instructions for fencing operations in the networked storage environment.

In accordance with illustrative embodiments of the invention, a change in cluster membership is detected by the cluster software and, in response, the fencing program is initiated. The fencing program generates host fencing API messages that notify the NFS server on the storage system to instruct an export module to change access permission rights of one or more cluster members affected by the change (i.e., the "target" cluster members) such that write access by the target cluster members is restricted from certain data in the form of files, directories, or the storage system itself. Cluster membership can change when there is a failure of one or more of the cluster members, or upon the addition of a new cluster member, or upon a failure of the communication link between cluster members, for example. The cluster member is fenced off from the shared data or storage device to avoid any risk of spurious messages being sent by a failed or failing component. It is noted that for the purpose of clarity of illustration, the invention is described with reference to a two-node cluster embodiment. However, the invention is not limited to such a deployment and instead, the invention can be readily employed in a wide variety of clustered environments that include one or more clusters of greater than two nodes as well as multiple storage systems that may include one or more clusters of storage systems.

The fencing technique of the present invention on the host cluster side is illustratively implemented in a software program embodied as fencing program 136a on the cluster member 130a, for example. In alternate embodiments, the functionality of the fencing program 136 may be implemented as a module that is integrated with the clustering software 132 executing on each node. Referring to FIGS. 1 through 3, the fencing program transmits a host API message to the storage system when a fencing operation is to be performed. The host API message is illustratively sent as a TCP/IP packet utilizing the HTTP protocol. The packet is received by the storage system at media access layer 310, which processes the packet prior to passing it to IP layer 312 of the protocol stack. The IP portion of the packet is stripped and interpreted, and the remainder of the packet is passed to TCP layer 314. The TCP layer 314, in turn, parses the packet and interprets it as an HTTP message and, thus, passes the remaining portion of the packet to HTTP layer 324. The HTTP layer then interprets the message and passes it to an Export Module within the NFS layer 320 (as described further with reference to FIG. 4) via a host fencing API interface 325.

Figure 4:
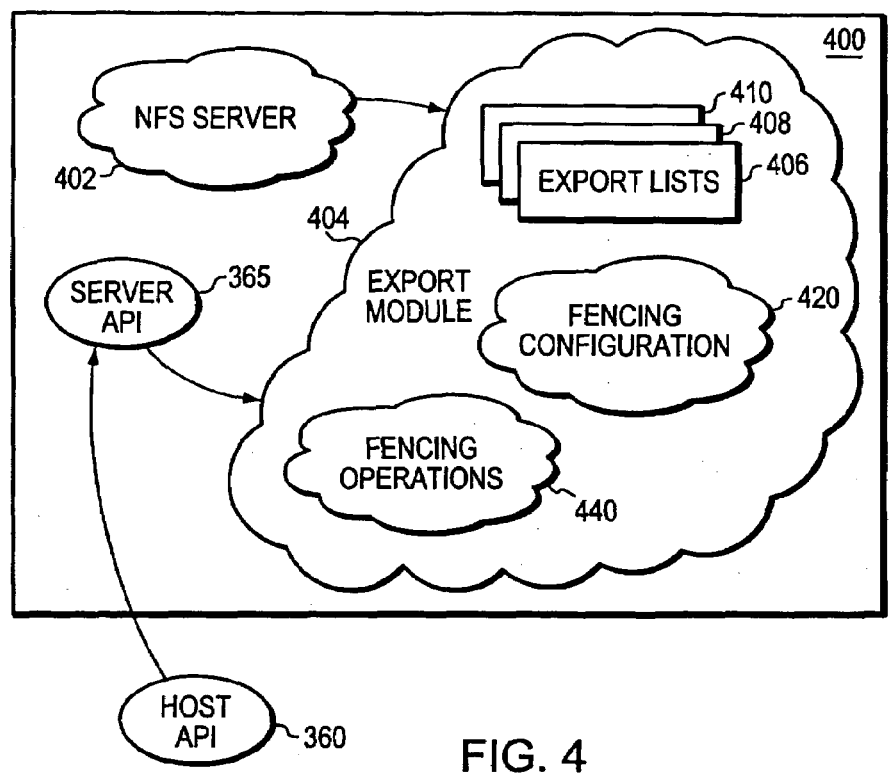
FIG. 4 is a schematic block diagram illustrating an NFS server, which can be advantageously employed in the storage system in accordance with an embodiment of the present invention.

FIG. 4 depicts a schematic software process arrangement 400 embodying the NFS layer 320 that includes an NFS server 402 that communicates with an export module 404 (residing in the memory 224 of the storage system 200.) The export module 404 contains NFS export lists 406, 408 and 410, which are also referred to herein as "NFS exports." The NFS export lists set forth permission rights regarding the read-write access and/or read-only access of cluster members (as identified by their respective IP addresses or hostnames) with respect to certain data in files and/or directories of the storage system. The restriction can also apply to an entire storage system.

The storage system, and in particular the Export Module 404, are initially configured to support the fencing program running on the cluster members. The details of the fencing procedure of the present invention on the storage system side are set forth in the above cited commonly-owned U.S. patent application Ser. No. 11/187,649, of Haynes, et al., for AN API FOR FENCING CLUSTER HOSTS VIA EXPORT ACCESS RIGHTS, filed on even date herewith, now issued as U.S. Pat. No. 7,516,285 on Apr. 7, 2009, which has been incorporated by reference as though fully set forth herein.

Briefly, upon initial set up and configuration, export configuration module 420 specifies whether a cluster member has read-write access or read-only access with respect to particular directories or files. Read-only access is illustratively identified by an '-ro=' entry, which means that the cluster member identified after the -ro= has read only permission to files, directories, and/or storage systems specified. A cluster member that is granted read-write access, indicated by '-rw=' means the identified cluster member has read-write permission to the files, directories, and/or storage systems specified. In addition, administrative (root) access can be granted to cluster members if desired in a particular application of the invention.

Figure 5:
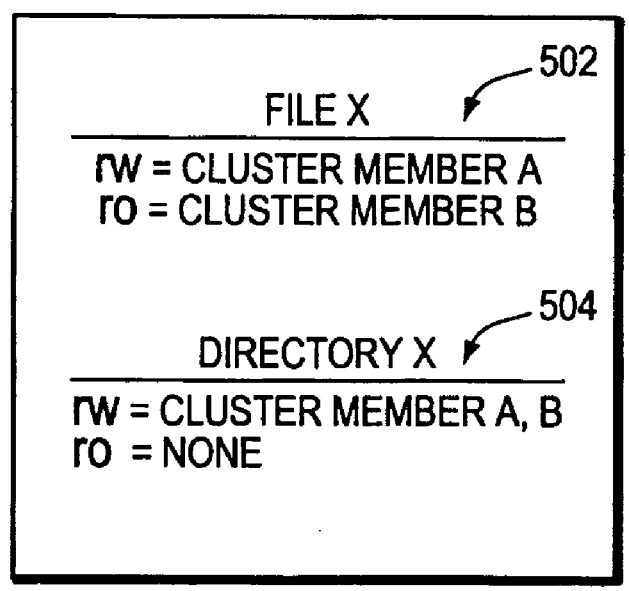
FIG. 5 is a schematic block diagram illustrating the format of an exemplary export list in accordance with an embodiment of the present invention.

An example of a set of export lists 500 is schematically illustrated in FIG. 5. The export list 502 is a list of cluster members that have either read-write permission, or read-only permission to File X. Though not shown in the schematic illustration of FIG. 5, the cluster members can be identified by any one of their respective IP addresses, hostnames netgroups and the like. Typically, a cluster member is addressed by either its IP address or host name. The export list 504 is a list of cluster members that have either read-write permission or read-only permission to Directory X, for example. For additional protection, a constraint may also be included whereby an IP address must appear on one of the lists or otherwise is considered a non-valid address and access is restricted completely for that particular IP address.

Figure 6A:
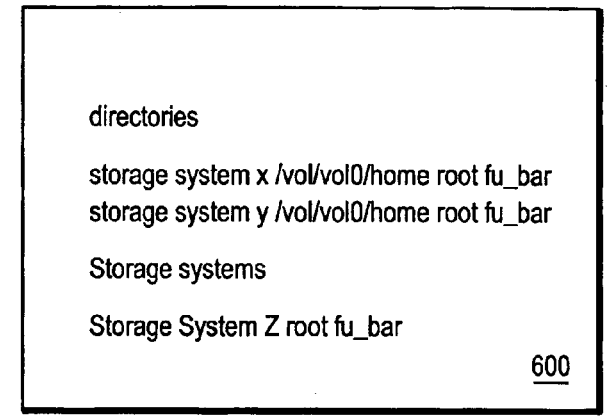
FIG. 6A is an exemplary block of code representing a configuration file for configuring aspects of the storage system in accordance with illustrative embodiments of the invention.

In order to implement a fencing operation procedure of the present invention, the cluster 120 may be initially configured such that certain members have read-write permission and other members have read-only permission to certain data. In an illustrative embodiment, however, all cluster members are granted read-write access and if a cluster member is subsequently fenced off, its access permission rights to given exports are changed to read-only access. An initial configuration is illustratively provided by the fencing export module 420 (FIG. 4) on the storage system using a configuration file. The configuration file is illustratively written for a particular cluster member and specifies operations directed to individual exports and/or the storage system from which that cluster member may be fenced. The configuration file illustratively comprises up to 2 sections, which are named storage systems and directories respectively. If an entire storage system is identified, e.g., in the storage systems section, then all of the exports for that storage system are included in the fencing operation. A code block of a typical configuration file in accordance with an illustrative embodiment of the invention is illustrated in FIG. 6A.

For example, the first portion applies to the directories section having entries of the form (columns are separated by white spaces):

<storage system><export><username><password>

The subsequent storage systems section has entries of the form (columns are separated by whitespaces):

<storage system><username><password>

Thus, in the example shown in FIG. 6A, the cluster member to which the configuration file code block 600 relates is fenced off from (i) the export /vol/vol0/home on the storage system x, (ii) the export /vol/vol0/home on the storage system y, and (iii) all exports on the storage system Z.

After the cluster member and/or the export lists are initially configured and the storage system is in normal operation, the export module 404 utilizes the configuration file to perform fencing operations to restrict access to certain data. The fencing operations are illustratively initiated by the fencing program 136a when generating and sending host API messages that notify the export module 404 that the export lists 406 through 410 are to be modified. Modification is performed in accordance with the fencing technique of the present invention to restrict write access to data under certain circumstances, such as a failure of one of the cluster members.

The fencing program supports at least four key operations, each of which can be specified by a different command line option. The four operations are illustratively Fence (-D option), UnFence (-A option), Validate (-V) and Read Exports (-R option). The cluster 120 (FIG. 1) uses the -D and -A options to achieve fencing and unfencing. In addition, the cluster member node may also use -V for out-of-band sanity/validation checks.

When cluster membership changes, a surviving cluster member asserts a claim on the quorum device 172 (FIG. 1). If that cluster member claims the quorum device first, it then continues to communicate with the storage system 200 over the network 160. In addition, the surviving cluster member initiates the fencing operation of the present invention. In accordance with the fencing program, a host API message 360 (FIG. 4) is generated by the fencing program 136a (FIG. 1) of the surviving cluster member and is sent to the storage system, as illustrated in FIG. 4.

Upon receipt of the host API message 360, the Server API 365 instructs the export module 404 to modify the export lists as specified in the API message 360. The details of the NFS server's Fencing API instructions are set forth in commonly-assigned, co-pending U.S. patent application Ser. No. 11/187, 649 of Haynes, et al. for AN API FOR FENCING CLUSTER HOSTS VIA EXPORT ACCESS RIGHTS filed on even date herewith, now issued as U.S. Pat. No. 7,516,285 on Apr. 7, 2009, which is presently incorporated herein by this reference in its entirety, and which sets forth further details about the fencing operations as implemented on the storage system side of the network.

In accordance with an illustrative embodiment of the present invention, the fencing program is illustratively implemented as a command line interface (CLI) command such as:

fence <operation>[<options>]<config>[<node list>]

The <operation> field identifies the operation to be performed. As noted, any of the above mentioned operations can be used. For example, -A denotes "allow", i.e., the -A operation commands the NFS server to allow or add the supplied list of nodes to the read-write portion of the export list. This effectively unfences the affected cluster member from those exports. The -D entry is used to deny or remove the supplied list of nodes from the export lists so that those nodes are fenced from those exports. The -R entry denotes reading of the access controls and that the node list is not needed and is enforced. The -V entry denotes that the server should validate the configuration; in other words, the storage system and exports configuration should be validated.

The [<options>] field may be one of the following: -l indicates that NFS locks should be reclaimed. This is described in further detail in the above cited commonly-assigned, co-pending U.S. patent application Ser. No. 11/187, 649. The other options in accordance with an illustrative embodiment of the invention include: -u for a default username (root), -p for a default password (_none_), and -h which commands an associated user interface to "display this usage message."

Figure 6B:
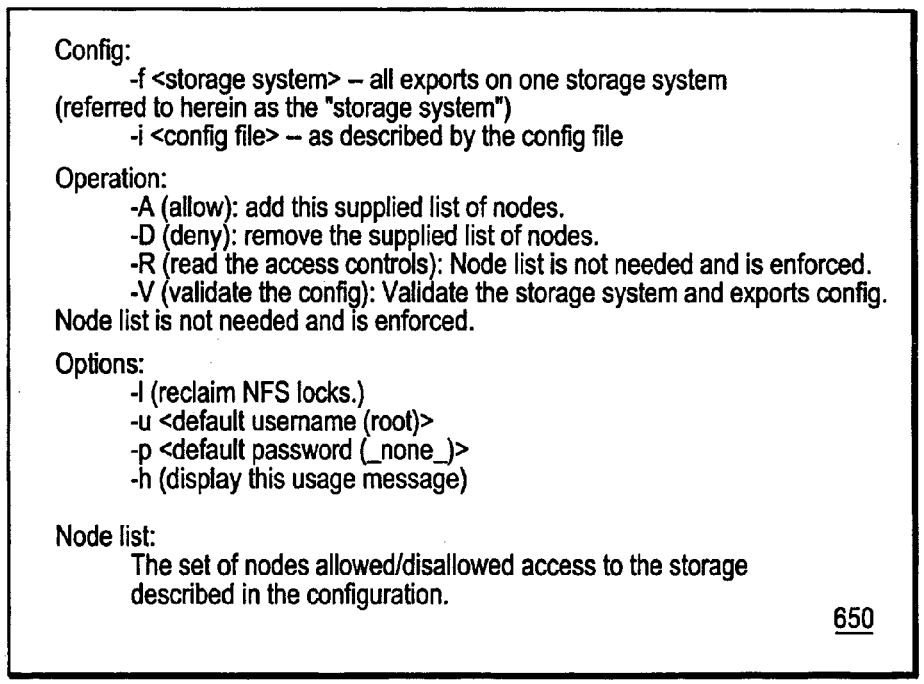
FIG. 6B is a chart setting forth various details for a host API message in accordance with illustrative embodiment of the invention.

The affected exports or storage system are identified in the <config> field. An -f entry indicates an entire storage system, meaning that all exports on the named storage system are subjected to the operation. Alternatively, a "config" file can be referenced and, in this case, all the exports and/or storage systems identified in the respective config file are subjected to the operation. The [<node list>] identifies the cluster members that are the subject of the operation. A user name and password are also specified. The above described usage information based upon the fencing program 136a of the present invention generates the host fencing API messages 360 is summarized in the chart 650 of FIG. 6B.

A specific example of a command line invocation of the fencing program in accordance with the invention may be of the form:

fence -D -f manor -u username -p fu_bar 10.1.1.56

This message specifies that the IP address 10.1.1.56 is fenced from all exports of the storage system called "manor." The username and password (fu_bar) used to connect to the storage system are also specified. As mentioned, the storage system is specified with the -f option.

Upon receiving the host fencing API message 360, the Server API 365 instructs the export module to modify the export lists 406, 408, and 410 such that specified cluster member(s) has an "-rw=" entry modified as to the identified exports or storage system. Accordingly, the specified cluster member no longer has read-write access to the files, directories or volumes indicated in that segment of the host API message 360. In an illustrative embodiment of the invention, those cluster members are listed on the read-only "export list" and are re-configured with an '-ro' permission for the files specified until they are unfenced by an appropriate command.

Figure 7:
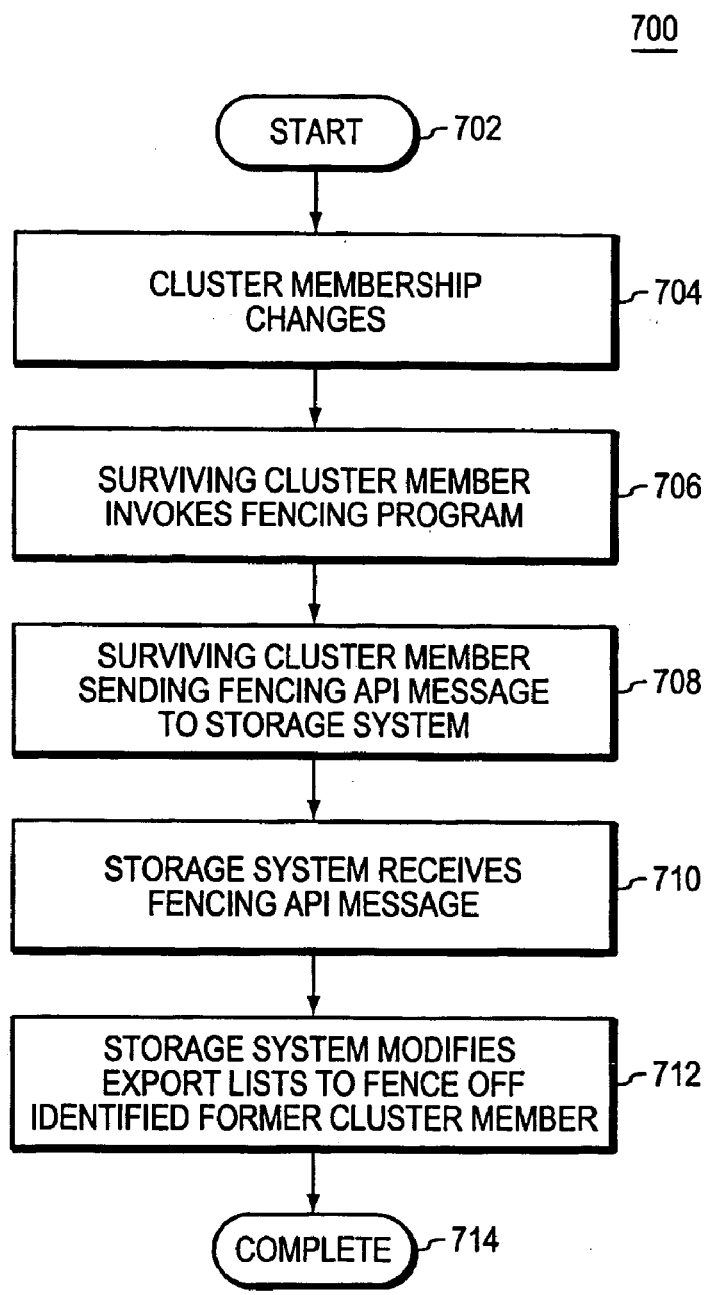
FIG. 7 is a flow chart detailing the steps of a procedure for performing fencing operations in accordance with the present invention.

Using this software code to generate the host fencing API messages 360, the fencing and unfencing operations are performed in accordance with the present invention. More specifically, the flow chart of FIG. 7 illustrates the procedure 700, which summarizes in broad terms, the steps of fencing technique of the present invention. As noted, the present invention relates to the fencing program 136a implemented on a cluster node 130a, for example (FIG. 1). Moreover, the above-cited commonly owned U.S. patent application Ser. No. 11/187, 649 filed on even date herewith, sets forth further details about the fencing operations as implemented on the storage system side of the network.

The procedure 700 begins with the start step 702 and continues to step 704 where the cluster software detects that the cluster membership in an established cluster has changed. For example, one of the clusters in the cluster 120 of FIG. 1 may have failed, or alternatively, a new node could be added as a cluster member to the cluster 120, or the communications over interconnect 170 between the clusters may have failed. In any of these circumstances, the cluster software detects that cluster membership has changed, or an administrator has notified the system of the change in cluster membership, in accordance with step 704.

In step 706, a surviving cluster member, such as the cluster member 130a, initiates the fence program 136a of the present invention. In step 708, the surviving cluster member transmits a host fencing API message over the network 160 to the storage system 200, where it is received by the storage system 200 in step 710 and passed to the NFS server. As a result, the Server API Module 365 (FIG. 4) instructs the export module 404 to modify the export lists 406 through 410 to fence off the identified former cluster member 130b, for example, as illustrated in step 712. Once the failed cluster member has been fenced off, operations continue with the surviving cluster member 130a and the procedure 700 completes in accordance with step 714.

Figure 8A:
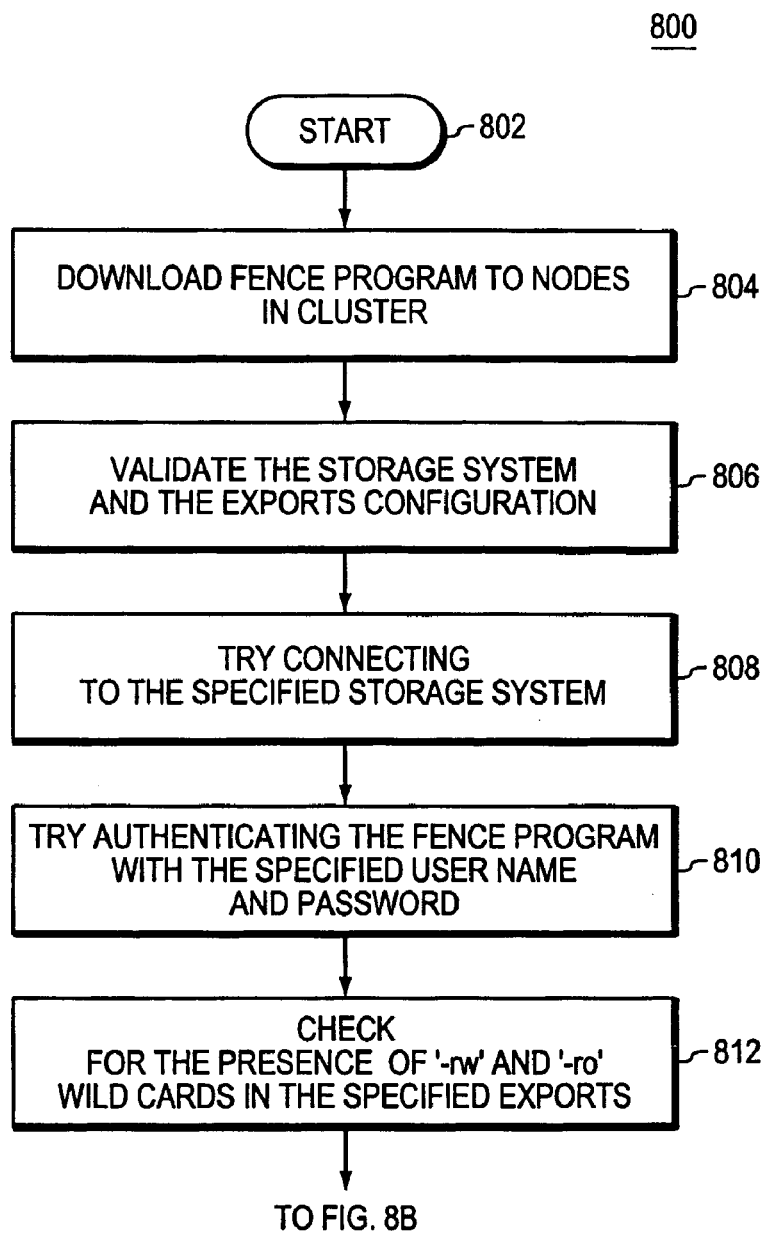
FIGS. 8A and 8B together form a flow chart detailing the steps of a procedure for configuration, validation and use of the fencing program in connection with the cluster software running on a cluster member in accordance with illustrative embodiments of the present invention.
Figure 8B:
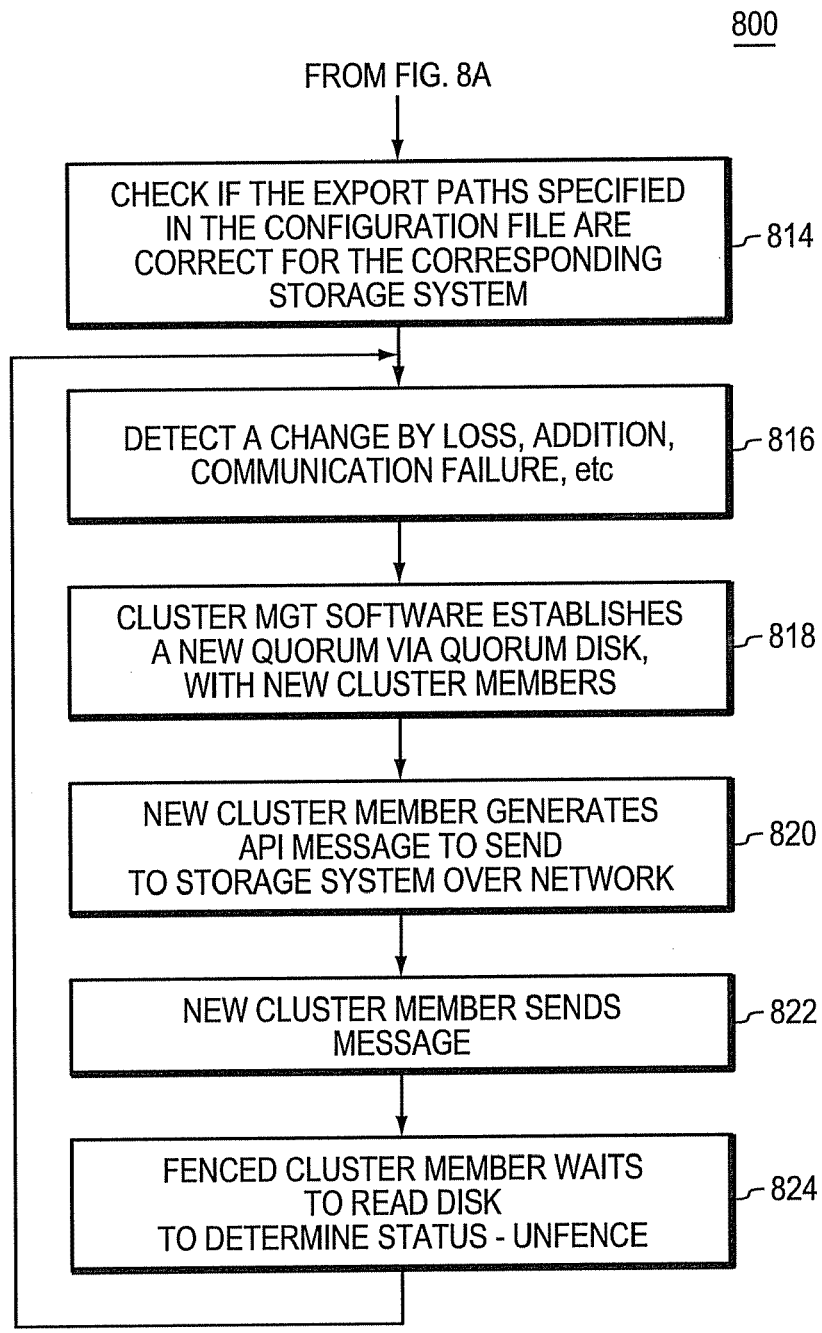

The fencing operations on the cluster side of the storage environment are illustrated in further detail in the flow chart of FIGS. 8A and 8B which together form a flow chart of a procedure 800. The procedure 800 starts with step 802 and continues to step 804, where the fence program is (down) loaded into each cluster member controlled by the fencing/unfencing procedure of the present invention. As part of this step 804, a user name and password required to access the storage system is noted for access from the cluster member.

In step 806, the storage system and the export configuration are validated and, in step 808, the cluster member attempts to connect to the specified storage system. Authentication with the specified user name and password is performed in step 810. In step 812, the fence program checks for the presence of "-rw" and "-ro" wild cards. If any such wild cards are detected, an error message is issued, and the procedure ends.

If no such wild cards are detected, then the procedure continues to step 814 where a determination is made as to whether the export paths specified in the configuration file for that particular storage system are indeed correct for the corresponding storage system. At this point, the fence program has been downloaded from a storage system provider's website or via an other suitable medium, as will be understood by those skilled in the art and the various validations and authentications have occurred and the program is ready for execution. A relatively weaker form of validation is performed when fence (-D) and unfence (-A) operations are executed on a cluster member. In this embodiment, it is confirmed whether the appropriate error messages are issued, but the operation continues to proceed. In contrast, a -V operation is specifically executed to validate the exports configuration, before using the shared data sources in this environment.

In step 816, a change in cluster membership is detected when there is a loss, addition or communication failure between cluster members. In that case, the cluster member software establishes a new quorum via the quorum disk 172 (FIG. 1) with a group of new cluster members in step 818. One of the surviving cluster members generates a host fencing API message 360 in accordance with the fence program in step 820 and transmits that message to the storage system over the network in step 822. Illustratively, the API message is sent in the form described herein.

In response to the host fencing API message 360, the export lists are modified accordingly to either fence (i.e., to restrict read-write access to one or more former cluster members) or unfence (i.e., to reinstate or allow read-write access to a previously fenced node). Once the fencing or unfencing operation has been performed, the fenced off cluster member can no longer write to the files and/or directories served by the storage system and does not share data with any of the new cluster members. A previously fenced cluster member waits to read the disk to determine status and to be brought to the same state as the other cluster members prior to continuing operations thereafter as shown in the step 824. Once the fencing operation is performed, the procedure 800 returns to wait until a further change is detected by loss, addition or other reason that a fence or unfence operation is to occur.

It should be understood that the present invention provides a unique mechanism and cluster side tool used to support a file system protocol, such as NFS, as a shared data source with Unix®-based host clustering products. The present invention is advantageous in that NFS data access over a network can still be afforded fencing techniques without the need for using SCSI-based reservations to perform fencing from the exported file systems of a storage system.

Thus, the invention provides a simplified user interface for fencing cluster members, which is easily portable across all Unix®-based host platforms. In addition, the invention can be implemented and used over TCP with insured reliability. The invention also provides a means to fence cluster members and enables the use of NFS in a shared collaborative clustering environment. It should be noted that while the present invention has been written in terms of files and directories, the present invention may be utilized to fence/unfence any form of networked data containers associated with a storage system. It should be further noted that the system of the present invention provides a simple and complete user interface that can be plugged into a host cluster framework which can accommodate different types of shared data containers. Furthermore, the system and method of the present invention supports NFS as a shared data source in a high-availability environment that includes one or more storage system clusters and one or more host clusters having end-to-end availability in mission-critical deployments having 24×7 availability.

The foregoing has been a detailed description of the invention. Various modifications and additions can be made without departing from the spirit and scope of the invention. Furthermore, it is expressly contemplated that the various processes, layers, modules and utilities shown and described according to this invention can be implemented as software, consisting of a computer readable medium including programmed instructions executing on a computer, as hardware or firmware using state machines and the like, or as a combination of hardware, software and firmware. Accordingly, this description is meant to be taken only by way of example and not to otherwise limit the scope of the invention.

What is claimed is:

1. A method for performing fencing in a clustered storage environment, comprising:
   providing a plurality of nodes configured in a cluster for sharing data, each node being a cluster member;
   providing a storage system that supports a plurality of files for access by each cluster member, said storage system supporting a protocol that configures export lists, said export lists assigning each cluster member certain access permission rights including read-write access permission or read only access permission as to each respective file associated with the storage system;
   connecting a quorum device directly to each node of the plurality of nodes and the quorum device is configured in such a manner that the cluster member that reserves the quorum device through a SCSI-based reservation first is thereby granted access to the storage system and establishes quorum in the cluster, wherein the quorum device allows for quorum to be reached by a single node in a two node cluster and traditional quorum requires greater than fifty percent of nodes are active in the cluster;
   providing a fencing program in each cluster member;
   detecting a change in cluster membership; and
   in response to the change in cluster membership, initiating, by a surviving member, the fencing program by transmitting an application program interface message to said storage system commanding said storage system to modify one or more of said export lists such that the access permission rights of one or more identified cluster members are modified, wherein the surviving member is the cluster member that reserves the quorum device through the SCSI-based reservation first.

2. The method of claim 1 wherein said protocol used by said storage system is a Network File System protocol.

3. The method of claim 1 wherein said cluster is coupled to the storage system over a network using Transmission Control Protocol/Internet Protocol.

4. The method of claim 1 wherein said cluster member transmits said application program interface messages encapsulated in HyperText Transfer Protocol messages.

5. The method of claim 1, further comprising:
   configuring the storage system such that each cluster member has a set of access permission rights set forth in a configuration file.

6. The method of claim 5 wherein said application program interface message provides said modifications to said access permission rights of said initial configuration.

7. The method of claim 1, further comprising:
   validating the storage system and the export list configuration.

8. The method of claim 1, further comprising:
   checking an initial configuration for the presence of any wildcard entries in said export lists, and if said wildcard entries are found, issuing an error message.

9. The method of claim 1 wherein a change in cluster membership is determined by an associated cluster infrastructure.

10. The method of claim 1, wherein a file or directory is fenced to one or more identified cluster members without using SCSI-based reservations.

11. A computer readable medium containing executable program instructions executed by a processor, comprising:
    program instruction that provide a plurality of nodes configured in a cluster for sharing data, each node being a cluster member;
    program instruction that provide a storage system that supports a plurality of files and directories for access by each cluster member, said storage system supporting a protocol that configures export lists, said export lists assigning each cluster member certain access permission rights including read-write access permission or read only access permission as to each respective file or directory associated with the storage system;
    program instructions that connect a quorum device directly to each node of the plurality of nodes and the quorum device is configured in such a manner that the cluster member that reserves the quorum device through a SCSI-based reservation first is thereby granted access to the storage system and establishes quorum in the cluster, wherein the quorum device allows for quorum to be reached by a single node in a two node cluster and traditional quorum requires greater than fifty percent of nodes are active in the cluster;
    program instruction that provide a fencing program in each cluster member;
    program instruction that detect a change in cluster membership; and
    in response to detecting a change in cluster membership, program instruction that initiate, by a surviving member, the fencing program by transmitting an application program interface message via said protocol over a network to said storage system commanding said storage system to modify one or more of said export lists such that the access permission rights of one or more identified cluster members are modified, wherein the surviving member is the cluster member that reserves the quorum device through the SCSI-based reservation first.

12. The computer readable medium of claim 11, further comprising:
    program instructions that send an application program interface message that provides said modifications to said access permission rights of an initial configuration by way of a configuration file or a command line.

13. The computer readable medium of claim 11, wherein changes in cluster membership are determined by an associated cluster infrastructure.

14. The computer readable medium of claim 11, further comprising:
    a user interface that can be plugged into a host cluster framework which can accommodate different types of shared files and directories.

15. The computer readable medium of claim 11, further comprising program instructions that support NFS as a shared data source in a high-availability environment that includes one or more storage system clusters and one or more host clusters having end-to-end availability in mission-critical deployments having substantially continuous availability.

16. A system, comprising:
    a plurality of nodes interconnected to form a cluster, wherein each node is a cluster member that provides storage services for one or more clients;
    a network storage system coupled to the cluster by way of a network, the network storage system connected to a plurality of storage devices, and the network storage system including an export list for each file or directory stored within the storage devices, each export list containing rules regarding access permission rights for one or more specified cluster members;
    a quorum device that is directly coupled to each cluster member and the quorum device is configured in such a manner that the cluster member that asserts a claim to the quorum device first is thereby granted access to the network storage system and establishes quorum in the cluster, wherein quorum device allows for quorum to be reached by a single node in a two node cluster and traditional quorum requires greater than fifty percent of nodes are active in the cluster; and
    a fencing program executing within each cluster member that includes program instructions for sending an application program interface message from a surviving cluster member to the network storage system and the application program interface message contains instructions for modifying the export list to change the access permission rights for a file or directory of a fenced cluster member, wherein the surviving cluster member asserts the claim to the quorum device first.

17. The system of claim 16, wherein the fenced cluster member is configured with read only access on each file or directory to allow the fenced cluster member to read the storage device to determine status and to be brought to a same state as the surviving cluster member.

18. The system of claim 16, wherein the file or directory is fenced to the fenced cluster member without using SCSI-based reservations.

19. The system of claim 16, wherein the quorum device is reserved using a SCSI-based reservation.

* * * * *

UNITED STATES PATENT AND TRADEMARK OFFICE
CERTIFICATE OF CORRECTION

PATENT NO.       : 7,653,682 B2                                       Page 1 of 1
APPLICATION NO. : 11/187781
DATED            : January 26, 2010
INVENTOR(S)      : Erasani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this

Twenty-third Day of November, 2010

David J. Kappos
*Director of the United States Patent and Trademark Office*